United States Patent
Shperling et al.

(10) Patent No.: US 10,455,016 B2
(45) Date of Patent: Oct. 22, 2019

(54) METHODS AND SYSTEMS FOR MERGING ISOLATED NETWORKS

(71) Applicant: MOTOROLA SOLUTIONS, INC., Chicago, IL (US)

(72) Inventors: Itzhak Shperling, Bnei-Brak (IL); Baruh Hason, Tel Aviv-Yaffo (IL); Gabi Ofir, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 198 days.

(21) Appl. No.: 15/498,216

(22) Filed: Apr. 26, 2017

(65) Prior Publication Data

US 2018/0316544 A1    Nov. 1, 2018

(51) Int. Cl.
*H04L 29/08* (2006.01)
*H04W 92/20* (2009.01)
*H04W 88/12* (2009.01)

(52) U.S. Cl.
CPC ......... *H04L 67/1095* (2013.01); *H04W 92/20* (2013.01); *H04W 88/12* (2013.01)

(58) Field of Classification Search
CPC .... H04L 67/1095; H04W 88/12; H04W 92/20
See application file for complete search history.

(56) References Cited

U.S. PATENT DOCUMENTS

| | | | |
|---|---|---|---|
| 8,040,840 B2 | 10/2011 | Lee et al. | |
| 10,135,678 B2 * | 11/2018 | Chakrabarti | H04L 41/0806 |
| 2014/0199963 A1 * | 7/2014 | Mohebbi | H04W 76/12 455/410 |
| 2016/0066168 A1 * | 3/2016 | Fodor | H04W 4/023 455/404.1 |
| 2016/0269534 A1 * | 9/2016 | Roldan | H04M 1/72538 |
| 2016/0295408 A1 * | 10/2016 | Chen | H04W 4/90 |
| 2016/0330658 A1 * | 11/2016 | Hayashi | H04W 4/90 |
| 2016/0345152 A1 * | 11/2016 | Melander | H04W 4/90 |
| 2016/0352601 A1 * | 12/2016 | Zhang | H04L 43/0823 |
| 2017/0289883 A1 * | 10/2017 | Kiss | H04W 4/90 |
| 2017/0353380 A1 * | 12/2017 | Ergen | H04L 45/24 |
| 2018/0084395 A1 * | 3/2018 | Noor | H04W 76/10 |
| 2018/0084587 A1 * | 3/2018 | Noor | H04W 12/06 |
| 2018/0242205 A1 * | 8/2018 | Mildh | H04W 36/0055 |
| 2018/0295138 A1 * | 10/2018 | Harris | H04L 63/20 |

* cited by examiner

*Primary Examiner* — Uzma Alam
(74) *Attorney, Agent, or Firm* — Michael Best & Friedrich LLP

(57) ABSTRACT

Methods and systems for merging isolated networks. One method includes determining that a second network is located within a predetermined distance of a first network. The method also includes exchanging content between a first network core of the first network and a second network core of the second network over a side haul communication channel. The exchange of content results in a first base station transceiver of the first network being capable of communicating with first network components of the first network core and with mirrored instances of second network components of the second network core within the first network core. The method also includes controlling, with the first network core, communications through the first base station transceiver using the second content included in the mirrored instances of the second network components.

20 Claims, 7 Drawing Sheets

US 10,455,016 B2

METHODS AND SYSTEMS FOR MERGING ISOLATED NETWORKS

BACKGROUND OF THE INVENTION

Public safety agencies responding to an incident (for example a building fire, a criminal pursuit or other law enforcement event, a natural disaster, a medical incident, a traffic accident, and the like) may coordinate response efforts using wireless communications devices. The wireless communications devices communicate voice, data, video, and other traffic through one or more network sub-systems (for example, a Long Term Evolution (LTE) wireless network) providing communications coverage at or near the area of the incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

In FIG. 6A, the first network and the second network are isolated from each other.

Figure 1:
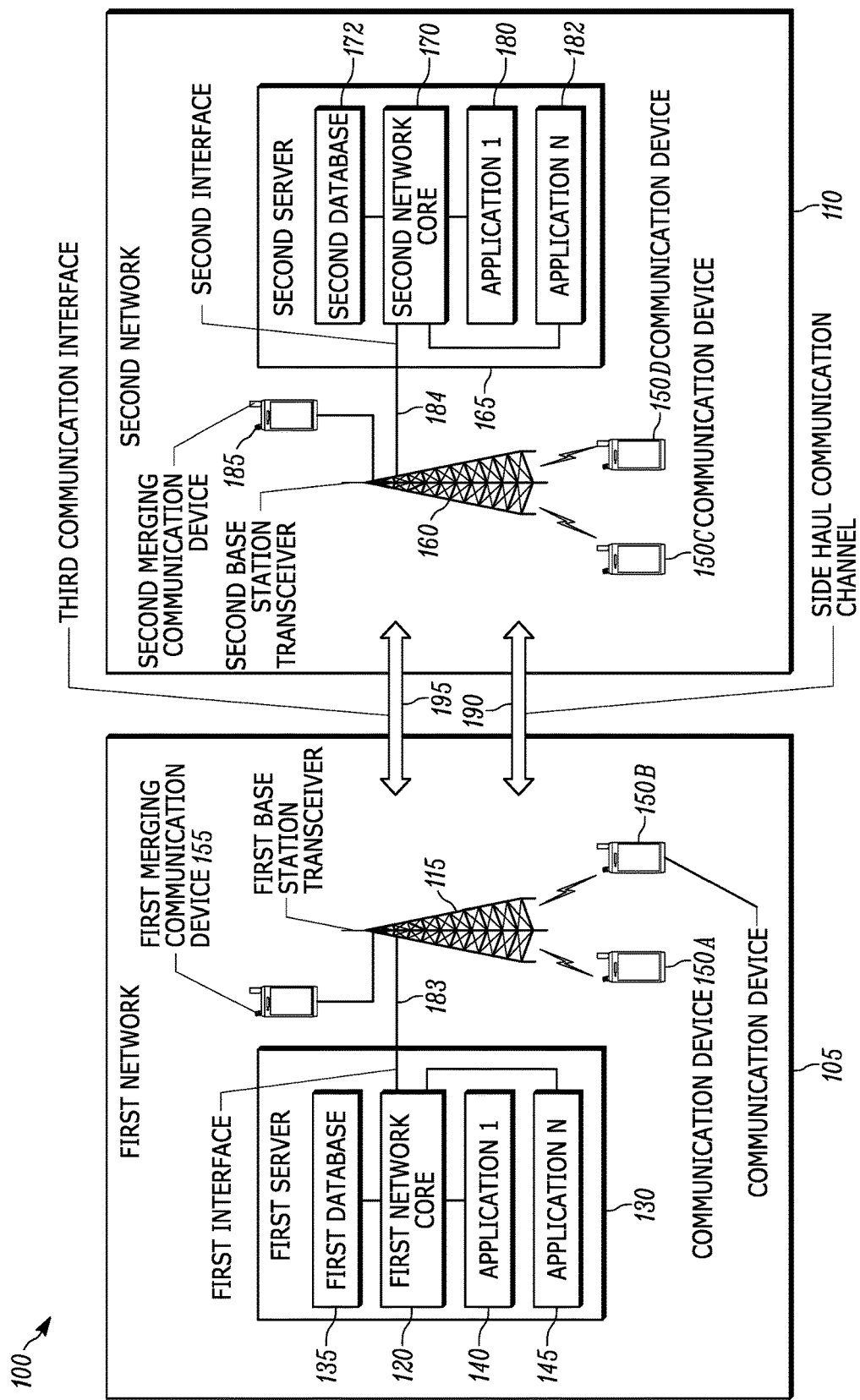
FIG. 1 is a diagram of a communications system according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Mobile incident area and radio access networks provide, among other things, a communications infrastructure for first responders and others at an incident scene. However, mobile incident area and radio access networks typically provide a limited area of coverage and may be isolated from other mobile incident area and radio access networks (for example, remotely-located incident area networks). During use, these mobile incident area and radio access networks may move such that they are located close enough to other mobile incident area and radio access networks to form one multi-cell network (for example, a multi-cell Long Term Evolution (LTE) network).

One embodiment provides a method of merging isolated networks. The method includes determining, with an electronic processor of a first network, that a second network is located within a predetermined distance of the first network. The method also includes transmitting first content of a first network core of the first network to the second network over a side haul communication channel. The method also includes receiving, at the first network, second content of a second network core of the second network over the side haul communication channel. The method also includes storing the second content in the first network core such that the first network core includes the first content and the second content. The second content is also stored in the first network core such that a first base station transceiver of the first network is capable of communicating with first network components of the first network core and with mirrored instances of second network components of the second network core within the first network core. The method also includes establishing a communication interface between the first base station transceiver and a second base station transceiver of the second network. The method also includes controlling, with the first network core, communications through the first base station transceiver using the second content included in the mirrored instances of the second network components.

Another embodiment provides a first network having three states. The first network includes a first base station transceiver, a first network core, and an electronic processor configured to control the first network to be in one of the three states. One state of the first network is an isolated state where the first network core controls communication between communication devices through the first base station transceiver using first content of the first network core. Another state of the first network is a transition state where the electronic processor has determined that a second network is located within a predetermined distance of the first network. Also in the transition state, the first network transmits the first content of the first network core to the second network over a side haul communication channel. Also in the transition state, the first network receives second content of a second network core of the second network from the second network over the side haul communication channel. Also in the transition state, the electronic processor stores the second content in the first network core such that the first network core includes the first content and the second content. The second content is also stored in the first network core such that the first base station transceiver is capable of communicating with first network components of the first network core and with mirrored instances of second network components of the second network core within the first network core. Also in the transition state, the electronic processor establishes a communication interface between the first base station transceiver and a second base station transceiver of the second network. Another state of the first network is a merged state where the first network core controls communication between communication devices through the first base station transceiver using the second content included in the mirrored instances of the second network components.

FIG. 1 is a diagram of a communications system 100 according to one embodiment. In the example illustrated, the communications system 100 includes a first network 105 and a second network 110. In some embodiments, the first network 105 and the second network 110 may be mobile radio access networks (for example, Long Term Evolution (LTE) networks). In some embodiments, the networks 105 and 110 are mobile incident area networks (in other words, deployable networks) that provide a communications infrastructure for first responders and others at an incident scene. In some embodiments, components of the networks 105 and 110 are configured to be mounted on a vehicle or another means for transporting and deploying the networks 105 and 110.

Figure 3:
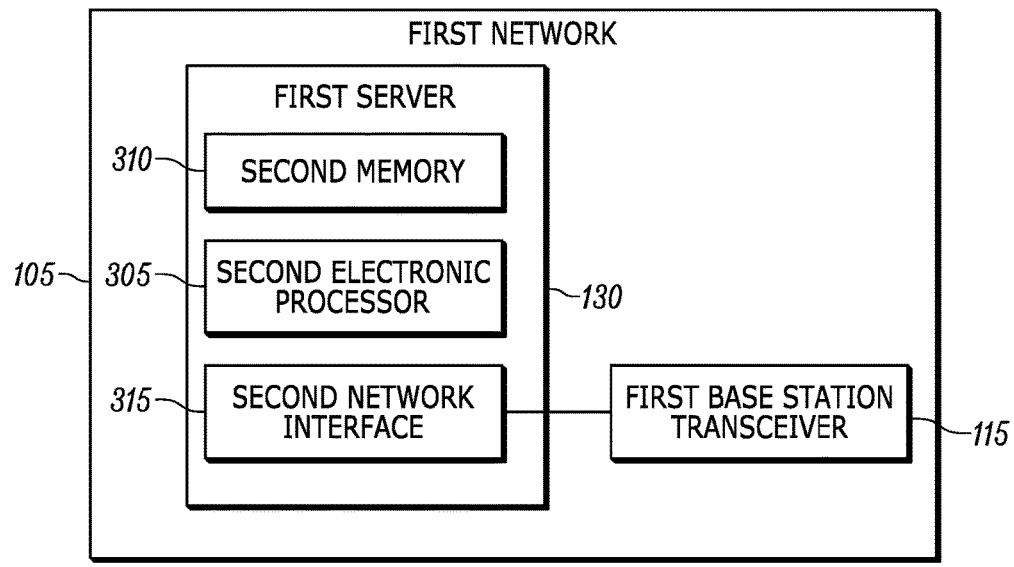
FIG. 3 is a diagram of a first server included in the communications system of FIG. 1 according to one embodiment.

The first network 105 includes a first transceiver 115 (for example, a base station such as an Evolved Node B (eNodeB) which will be referred to hereinafter as first base station transceiver 115) coupled to a first network core 120 (for example, an Evolved Packet Core (EPC) according to Long Term Evolution network protocol). In some embodiments, the first network core 120 is implemented on a first server 130. As shown in FIG. 1, the first server 130 also includes a first database 135 (for example, a home subscriber server (HSS) according to Long Term Evolution network protocol). Although the first database 135 is shown as a separate element from the network core 120 in FIG. 1, in some embodiments, the first database 135 is a network component included within the network core 120. The first server 130 also includes a first application 140, and an Nth application 145. The applications 140 and 145 are executed outside of the network core 120 and may include, for example, an Internet Protocol Multimedia Subsystem (IMS), a mission critical push-to-talk (MCPTT) application, and the like. One or more of the components of the first server 130 may be implemented on one or more electronic devices (for example, including an electronic processor, a memory, and a network interface) as illustrated in FIG. 3. When implemented on multiple electronic devices, the components of the first server 130 as well as additional components may be coupled to one another by one or more control or data buses or wireless communication links, or a combination thereof. In some embodiments, the first server 130 is coupled to the first base station transceiver 115 through a wired connection, a wireless connection, or a combination of wired and wireless connections. In some embodiments, one or more components of the first server 130 are integrated into the first base station transceiver 115. In other words, in some embodiments, the first base station transceiver 115 may include its own computation platform including, for example, an electronic processor. The first server 130 interprets signals received by the first base station transceiver 115 from other devices. The first server 130 also controls transmission of signals from the first base station transceiver 115 to other devices. In the following description, when the first base station transceiver 115 is described as transmitting data, forwarding data, and the like, the first server 130 is performing these tasks and controlling the first base station transceiver 115 to transmit corresponding signals.

The first network 105 also includes communication devices 150A and 150B. The communication devices 150A and 150B are configured to wirelessly communicate with each other through the first base station transceiver 115 (for example, by sending and receiving radio signals). The first base station transceiver 115 wirelessly communicates with communication devices located within a wireless communication range of the first base station transceiver 115 (for example, the communication devices 150A and 150B). In some embodiments, the first network 105 provides Long Term Evolution cellular service to communication devices within a limited area (for example, within wireless communication range of the first base station transceiver 115). In some embodiments, the first network 105 may include fewer or additional components.

In some embodiments, the first network 105 also includes a first merging communication device 155 that is coupled to the base station transceiver 115 via a wired connection, a wireless connection, or a combination thereof. In some embodiments, the merging communication device 155 detects the proximity of the first network 105 to other mobile incident area networks (for example, the second network 110) as explained in greater detail below.

The second network 110 includes a second transceiver 160 (referred to hereinafter as second base station transceiver 160) coupled to a second server 165. Similar to the first server 130, the second server 165 includes a second network core 170, a second database 172, and applications 180 and 182. The second network 110 also includes communication devices 150C and 150D and a second merging communication device 185. The components of the second network 110 are similar to those described above with respect to the first network 105 and perform similar functions. Like the first network 105, in some embodiments, the second network 110 may include fewer or additional components. For example, the second network 110 may include additional communication devices or additional components within the second server 165. Although FIG. 1 shows the first network 105 and the second network 110 with similar components, in some embodiments, the first network 105 and the second network 110 are not identical and include different components or a different combination of similar components.

In some embodiments, the network cores 120 and 170 are Evolved Packet Cores that include network components for controlling the operation of the respective networks 105 and 110 and routing traffic within and outside of the respective networks 105 and 110. The network cores 120 and 170 also include network components for authenticating and associating communication devices to the respective networks 105 and 110 (for example, attaching communication devices to the respective base station transceivers 115 and 160). In some embodiments, the network components of each of the network cores 120 and 170 include a mobility management entity (MME), a serving gateway (SGW), and a packet data node gateway (PDN GW) according to Long Term Evolution network protocol. In the following description, when explaining the mirroring of network components, a reference to the network components refers to the exemplary network components listed above. Such reference to network components also includes the databases 135 and 172 (in other words, home subscriber servers) regardless of whether the databases 135 and 172 are separate from the network cores 120 and 170 (as shown in FIG. 1) or included within the network cores 120 and 170 (as mentioned previously herein).

In some embodiments, each of the network components of each network core 120 and 170 is associated with a different internet protocol (IP) address (as explained in greater detail below with respect to FIG. 6B). In other embodiments, each of the network components of each network core 120 and 170 is configured to be associated with the same Internet Protocol address (as explained in greater detail below with respect to FIG. 6C). The base station transceivers 115 and 160 use the Internet Protocol address of each of the respective network components to manage communications between the communication devices 150 within their respective coverage area.

As shown in FIG. 1, the first network core 120 communicates with the first base station transceiver 115 over a first interface 183. The second network core 170 communicates with the second base station transceiver 160 over a second interface 184. In some embodiments, the first interface 183 and the second interface 184 are 51 interfaces according to Long Term Evolution network protocol.

The base station transceivers 115 and 160 include hardware and software components for communicating wirelessly with other devices and networks. For example, in some embodiments, the network cores 120 and 170 control their respective base station transceivers 115 and 160 to communicate with at least one of the communication devices 150A through 150D. The databases 135 and 172 store information relating to devices configured to communicate within the respective first network 105 and the second network 110. For example, the first database 135 stores information that may be used by the first network core 120 for identification of communication devices 150A and 150B and addressing of messages to and from communication devices 150A and 150B. In some embodiments, the databases 135 and 172 store information relating to which base station transceiver each communication device 150A through 150D is attached.

As shown in FIG. 1, the first network 105 and the second network 110 may be communicatively coupled via a side haul communication channel 190. In some embodiments, the side haul communication channel 190 is established between the first merging communication device 155 and the second merging communication device 185. In other embodiments, the side haul communication channel 190 allows direct mode communication (for example, via WiFi) between the base station transceivers 115 and 160 or between other devices within the networks 105 and 110. In some embodiments, the side haul communication channel 190 is a combination of the embodiments described previously herein. FIG. 1 also shows a third communication interface 195 that may be established between the base station transceivers 115 and 160 when the networks 105 and 110 have merged with each other as explained in greater detail below. In some embodiments, the third communication interface 195 is an X2 interface according to Long Term Evolution network protocol. In some embodiments, the third communication interface 195 may be implemented using the side haul communication channel 190. In such embodiments, data communicated over the third communication interface 195 is separated from other data communicated over the side haul communication channel 190 (in other words, the data is communicated through separate communication pipes).

In the following description, when explaining how a single communication device functions, a reference to communication device 150 is used. It is not necessary, however, that the communication devices 150A through 150D be identical. The communication devices 150A through 150D are merely examples. Additionally, in some embodiments, one or both of the first network 105 and the second network 110 may include more or fewer communication devices than illustrated in FIG. 1.

As illustrated in FIG. 1, the communication device 150 may be a handheld communication device, for example, a mobile telephone or other portable communication device, mobile radio, smart watch or other smart wearable device, drone, or other device configured to communicate over at least one of the first network 105 and the second network 110. In some embodiments, the communication device 150 may be a handheld radio carried by a public safety officer or first responder, such as a police officer. In some embodiments, the communication device 150 may be a smart telephone carried by a person for personal use. In some embodiments, the communication device 150 may be a mobile communication device mounted in or on a vehicle (for example, a police vehicle). In some embodiments, the communication device 150 may be a device maintained, for example, at a call center or public safety command center.

Figure 2:
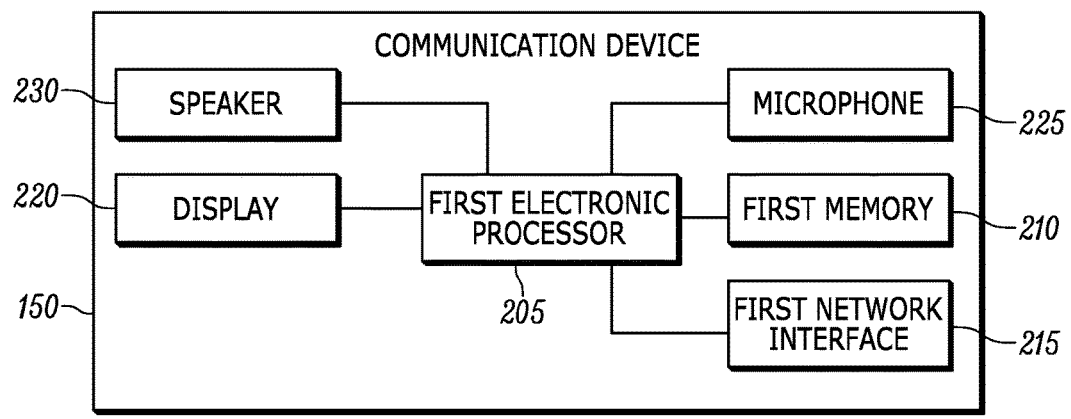
FIG. 2 is a diagram of a communication device included in the communications system of FIG. 1 according to one embodiment.

FIG. 2 is a diagram of the communication device 150 of the communications system 100 according to one embodiment. The communication device 150 includes a first electronic processor 205 (for example, a microprocessor or another electronic device). The first electronic processor 205 may include input and output interfaces (not shown) and be electrically coupled to a first memory 210, a first network interface 215, a display 220, a microphone 225, and a speaker 230. In some embodiments, the communication device 150 may include fewer or additional components in configurations different from that illustrated in FIG. 2. For example, in some embodiments, the communication device 150 also includes a camera and a location component (for example, a global positioning system receiver). In some embodiments, the communication device 150 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from one of the base station transceivers 115 and 160. For example, the first network interface 215 may include a radio transceiver for wirelessly communicating with the base station transceiver 115 or 160 (for example, using radio signals). The first electronic processor 205 receives electrical signals representing sound from the microphone 225 and may communicate information relating to the electrical signals to the base station transceiver 115 or 160 through the first network interface 215, such as for receipt by another communication device. Similarly, the first electronic processor 205 may output data received from the base station transceiver 115 or 160 or another device through the first network interface 215 to an output device of the communication device 150 such as the speaker 230, the display 220, or a combination thereof. In some embodiments, the merging communication devices 155 and 185 include similar components that perform similar functions as the communication device 150 described previously herein. In some embodiments, the merging communication devices 155 and 185 may include fewer or additional components.

FIG. 3 is a diagram of the physical devices of the first server 130 according to one embodiment. As shown in FIG. 3, the first server 130 includes a second electronic processor 305, a second memory 310, and a second network interface 315. These components are similar to those described above with respect to the communication device 150 and perform similar functions. The second electronic processor 305 controls the second network interface 315 to send and receive data (for example, network packets) within or outside of the first network 105. For example, the second network interface 315 is coupled to the first base station transceiver 115 to wirelessly couple the first network core 120, the communication devices 150A and 150B, and other components of the first network 105. Alternatively, or in addition, the second network interface 315 may include a connector or port for receiving a wired connection (for example, Ethernet) to the components of the first network 105. As mentioned previously herein, FIG. 3 is representative of the type of physical devices that may implement the components of the first server 130 shown in FIG. 1, including one or more elements of the first network core 120. In some embodiments, the first server 130 may include fewer or additional physical components.

Figure 4:
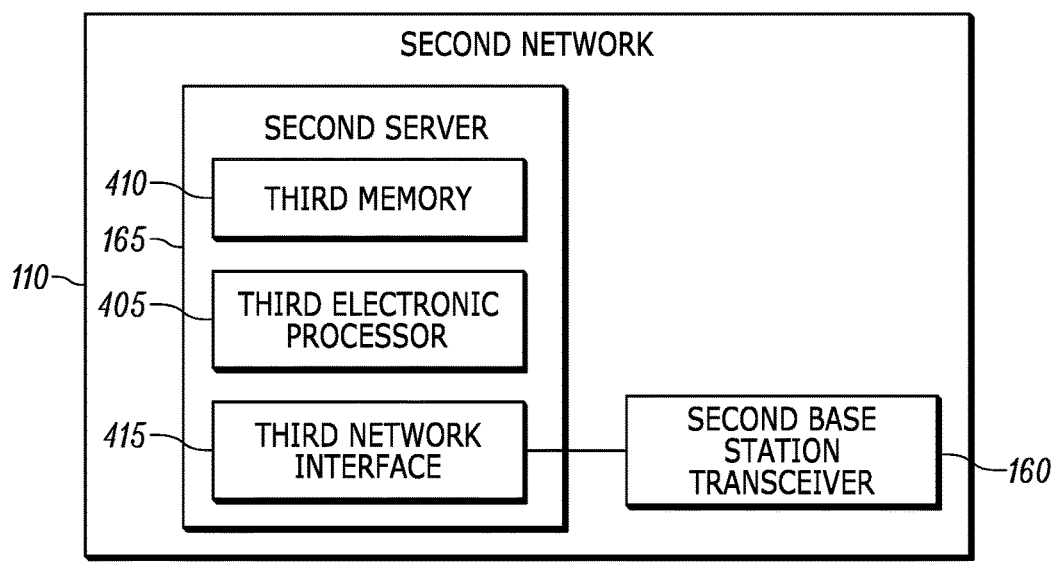
FIG. 4 is a diagram of a second server included in the communications system of FIG. 1 according to one embodiment.

FIG. 4 is a diagram of the physical devices of the second server 165 according to one embodiment. As shown in FIG. 4, the second server 165 includes a third electronic processor 405, a third memory 410, and a third network interface 415. These components are similar to those described above with respect to the first server 130 and perform similar functions. Similar to FIG. 3, FIG. 4 is representative of the type of physical devices that may implement the components of the second server 165 shown in FIG. 1, including one or more elements of the second network core 170. In some embodiments, the second server 165 may include fewer or additional physical components.

In some embodiments, the first network 105 has a first coverage area in which network communications (for example, between the first base station transceiver 115 and the communication devices 150A and 150B) occur over a first communications protocol. The second network 110 has a second coverage area in which network communications (for example, between the second base station transceiver 160 and the communication devices 150C and 150D) also occur over the first communications protocol. However, when initially deployed at the scene of an incident, the networks 105 and 110 may be remotely located from each other and a distance between the first network 105 and the second network 110 may be greater than a coverage radius of each of the first network 105 and the second network 110. As a consequence, there may not be overlap in their respective coverage areas when the networks 105 and 110 are initially deployed. In such circumstances, the first network 105 and the second network 110 (or at least some communication devices 150 in each network 105 and 110) may not be able to communicate with each other over the first communications protocol. Under such circumstances, because the networks 105 and 110 do not communicate with each other (for example, to perform a handover between base station transceivers 115 and 160 as a communication device 150 moves locations), the networks 105 and 110 may be considered to be isolated from one another. In such circumstances, the networks 105 and 110 are considered to be in an isolated state where each network core 120 and 170 controls communication between communication devices 150 through its respective base station transceiver 115 and 160.

During use, the networks 105 and 110 may move such that they are located close enough to each other to form one multi-cell network (for example, a multi-cell Long Term Evolution network). In such circumstances, merging the isolated networks 105 and 110 to form one multi-cell network may provide advantages such as unified coverage of a larger area than the area that each of the isolated networks 105 and 110 may provide independently. When the networks 105 and 110 are merged to form one multi-cell network, the networks 105 and 110 are in a merged state. As explained in greater detail below, in the merged state, changes in content of each network core 120 and 170 are mirrored by the other network core 120 or 170 such that there is one merged network core for both base station transceivers 115 and 160. Before entering the merged state, the networks 105 and 110 enter a transition state to exchange information with each other that allows the network cores 120 and 170 to mirror each other within the merged state.

Figure 5:
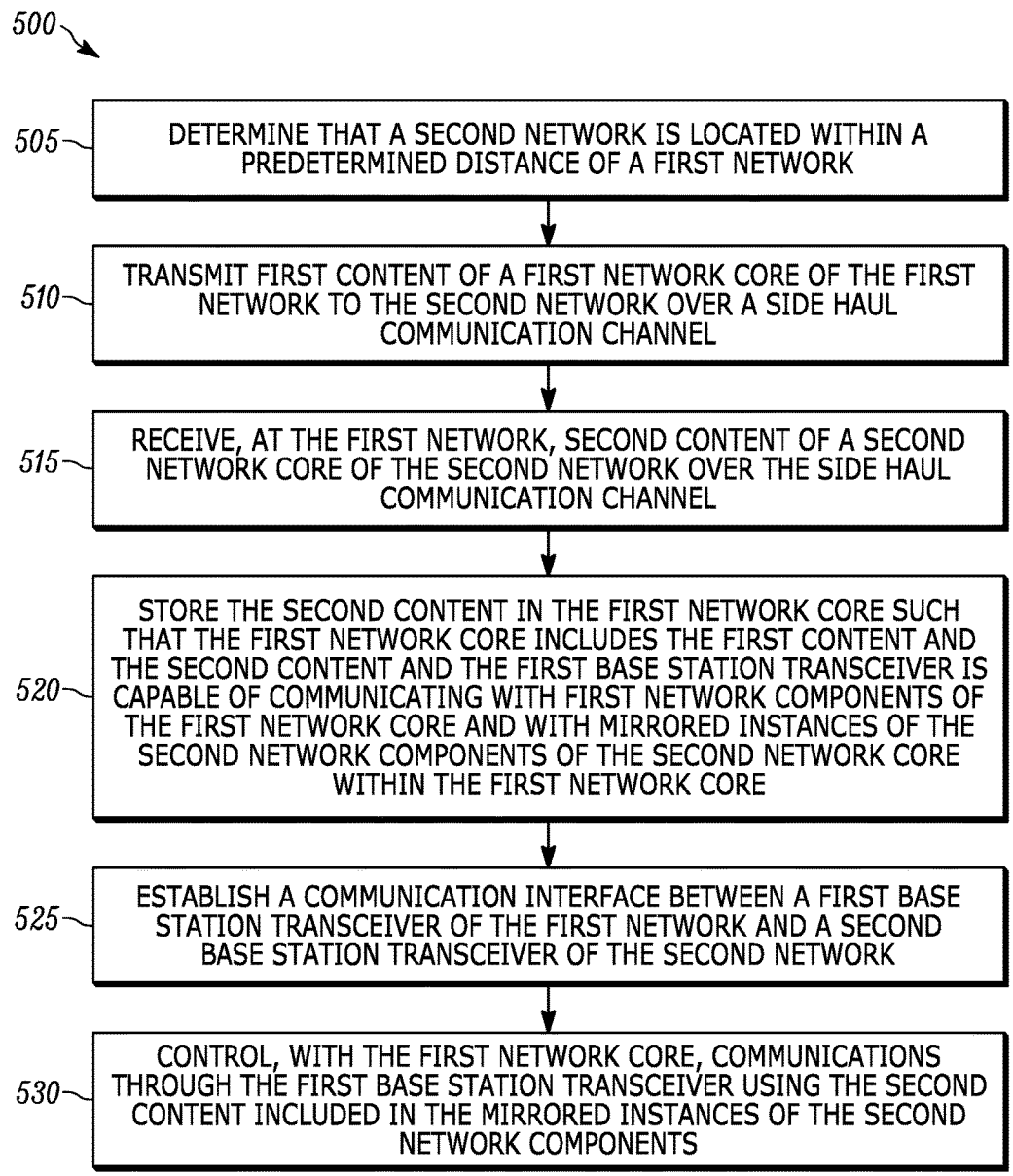
FIG. 5 is a flowchart of a method of merging two isolated networks to form one multi-cell network that is performed by a first network included in the communications system of FIG. 1 according to one embodiment.

FIG. 5 illustrates a method 500 of merging two isolated networks to form one multi-cell network that is performed by the first network 105 according to one embodiment. In the following description, the method 500 is described as being implemented by the first network 105, and in particular, the second electronic processor 305 of the first server 130. However, when the two networks 105 and 110 merge as explained below, the second network 110, and in particular, the third electronic processor 405 of the second server 165 also implements the method 500. In some embodiments, other networks within the communications system 100 implement the method 500 to merge with each other and the networks 105 and 110.

At block 505, the first network 105 is in the isolated state, and the second electronic processor 305 determines that the second network 110 is located within a predetermined distance of the first network 105. For example, the predetermined distance may be based on a coverage area of one or both of the networks 105 and 110 (in other words, based on the communication range of one or both of the base station transceivers 115 and 160 and the weather conditions of the area where the base station transceivers 115 and 160 are located). As another example, the predetermined distance may be pre-programmed into the second electronic processor 305 and may correspond to a known distance at which a single multi-cell network may be formed.

In some embodiments, the first merging communication device 155 receives a message from the second merging communication device 185 or another device within the second network 110 indicating a location of the second base station transceiver 160 and that the second network 110 is capable of merging with the first network 105. In some embodiments, the merging communication device 155 forwards location information included in the message to the first server 130 to allow the second electronic processor 305 to compare the location of the first network 105 to the location of the second network 110. In some embodiments, the networks 105 and 110 do not include the merging communication devices 155 and 185. In such embodiments, the electronic processors 305 and 405 communicate directly via the base station transceivers 115 and 160 to determine whether the second network 110 is located within the predetermined distance of the first network 105.

When the second electronic processor 305 determines that the second network 110 is not within the predetermined distance of the first network 105 (for example, when the first base station transceiver 115 has not received a location message from a device in the second network 110), the second electronic processor 305 continues to monitor the location of the second network 110. For example, the second electronic processor 305 continues to determine whether a location message from a device in the second network 110 has been received. At this point, the networks 105 and 110 continue to operate as isolated networks in the isolated state.

When the second electronic processor 305 determines that the second network 110 is within the predetermined distance of the first network 105 at block 505 (for example, by determining a location of the second network 110 based on a location message received from a device in the second network 110), the first network 105 and the second network 110 establish the side haul communication channel 190 between each other as described previously herein. The networks 105 and 110 then enter the transition state at block 510. In some embodiments, the establishment of the side haul communication channel 190 may be considered to be part of the transition state.

At block 510, the second electronic processor 305 transmits first content of the first network core 120 to the second network 110 over the side haul communication channel 190. As explained previously herein, the side haul communication channel 190 may be optionally established between the networks 105 and 110 using different devices (for example, the merging communication devices 155 and 185, the base station transceivers 115 and 160, other devices, or a combination thereof). The second electronic processor 305 transmits the first content via the device in the first network 105 that is used to establish the side haul communication channel 190 with the second network 110. In some embodiments, the first content transmitted by the second electronic processor 305 includes authentication information for the communication devices 150A and 150B that is stored in the first database 135. In some embodiments, the first content includes first home subscriber server content, first mobility management entity content, first serving gateway content, and first packet data network gateway content of the first network core 120. For example, the first content may include the Internet Protocol address of the first mobility management entity when the Internet Protocol address of the first mobility management entity is different than the Internet Protocol address of a second mobility management entity of the second network core 170.

At block 515, the first network 105 receives second content of the second network core 170 of the second network 110 over the side haul communication channel 190. In some embodiments, the second content is of the same type as the first content from the first network core 120 as explained previously herein. At block 520, the second electronic processor 305 stores the second content in the first network core 120 such that the first network core 120 includes the first content and the second content and such that the first base station transceiver 115 is capable of communicating with the first network components of the first network core 120 and with mirrored instances of second network components of the second network core 170 within the first network core 120.

In some embodiments, the networks 105 and 110 also exchange application information with each other for applications that are executed outside of the network cores 120 and 170. In other words, when the networks 105 and 110 each include an instance of an application that performs the same service, the networks 105 and 110 exchange content of each such application over the side haul communication channel 190. As shown in FIG. 1, the networks 105 and 110 each include a first application 140 and 180 and an Nth application 145 and 182. The first network 105 transmits third content of its applications 140 and 145 to the second network 110 over the side haul communication channel 190. Similarly, the first network 105 receives fourth content of the applications 180 and 182 from the second network 110 over the side haul communication channel 190 and stores the fourth content in the second memory 310 such that the applications 140 and 145 of the first network 105 include the content of the applications 180 and 182 of the second network 110. In other words, the content of the applications of each network 105 and 110 is mirrored in the corresponding applications on the other network.

After performing blocks 510, 515, and 520, the first network components of the first network 105 are mirrored on the second network 110 and the second network components of the second network 110 are mirrored on the first network 105. In other words, the first network 105 includes mirrored instances of the second network components, and the second network 110 includes mirrored instances of the first network components. With such an arrangement, the first base station transceiver 115 is able to communicate with the both the network components of the first network core 120 and the mirrored instances of the second network components of the second network core 170.

In some embodiments, from the perspective of the first base station transceiver 115, each of the mirrored instances of the second network components share a single, identical Internet Protocol address with its corresponding first network component. For example, a first mobility management entity of the first network 105 shares an identical Internet Protocol address with a mirrored instance of a second mobility management entity of the second network 110 as explained with respect to FIG. 6C below. In other words, a single mobility management entity of the first network core 120 includes first content of a first mobility management entity of the first network 105. This single mobility management entity also includes second content of the mirrored instance of the second mobility management entity. Similarly, in such embodiments, from the perspective of the communication devices 150, the applications 140 and 145 of the first network 105 share identical Internet Protocol addresses with the corresponding applications 180 and 182 of the second network 110.

In other embodiments, from the perspective of the first base station transceiver 115, each of the mirrored instances of the second network components have a different Internet Protocol address than its corresponding first network component. For example, the first mobility management entity of the first network 105 has a first Internet Protocol address and the mirrored instance of the second mobility management entity has a second Internet Protocol address that is different than the first Internet Protocol address (see FIG. 6B). In other words, each network 105 and 110 includes two instances of each network component (for example, its own mobility management entity at the first Internet Protocol address and a mirrored instance of the second mobility management entity of the second network 110 at the second Internet Protocol address).

While the above examples reference the mobility management entities of each network core 120 and 170, these examples apply to the other network components of the networks 105 and 110 described previously herein. From these examples, it can be seen that the each of the mirrored instances of the network components of one network may be integrated into corresponding single network components of another network. Alternatively, each of the mirrored instances of the network components of one network may have its own identity with a separate Internet Protocol address used by its respective base station transceiver.

At block 525, the second electronic processor 305 establishes a communication interface (in other words, the third communication interface 195) between the first base station transceiver 115 of the first network 105 and the second base station transceiver 160 of the second network 110. In some embodiments, the third communication interface 195 is an X2 interface according to Long Term Evolution network protocol. In such embodiments, the third communication interface 195 handles handovers between the base station transceivers 115 and 160 according to Long Term Evolution network protocol. As mentioned previously herein, in some embodiments, the third communication interface 195 may be implemented using the side haul communication channel 190. In such embodiments, data communicated over the third communication interface 195 is separated from other data communicated over the side haul communication channel 190. In other words, data communicated over the X2 interface is communicated through a separate communication pipe from data communicated to exchange and mirror content of the network components of the networks 105 and 110.

At block 530, the first network core 120 controls communications through the first base station transceiver 115 using the second content included in the mirrored instances of the second network components. For example, the first network core 120 controls communications between the communication devices 150A and 150B. In some embodiments, the first network core 120 also controls communications through the first base station transceiver 115 using the first content include the first network components. While the networks 105 and 110 are in the merged state, the mirrored instances of the second network components mirror changes in content of the second network components based on communications received over the side haul communication channel 190. Similarly, the second network components of the second network core 170 mirror changes in content of the mirrored instances of the second network components within the first network core 120. As a result, both network cores 120 and 170 are updated identically when changes occur in either network core 120 and 170 (for example, a handover). In some embodiments, the network cores 120 and 170 mirror each other by communicating over the side haul communication channel 190 in a similar manner as described previously herein with respect to blocks 510, 515, and 520. For example, when a new communication device 150 attaches to the second network core 170 via the second base station transceiver 160, the changes in the second content that occur in the second network components of the second network core 170 are mirrored by the mirrored instances of the second network components within the first network core 120 through communication over the side haul communication channel 190.

As will be recognized from the above description, the second server 165 of the second network 110 executes a similar method as the method 500 described previously herein. In doing so, the second network 110 exchanges information with the first network 105 (similar to blocks 510 and 515 of FIG. 5) and stores information from the first network 105 in the second network core 170 (similar to block 520 of FIG. 5). Accordingly, the second network core 170 includes the second content (in other words, its own content) and the first content from the first network 105. Such content allows the second base station transceiver 160 to communicate with the second network components and with mirrored instances of the first network components within the second network core 170. Similar to the first network core 120, the second network core 170 controls communications through the second base station transceiver 160 using the first content included in the mirrored instances of the first network components (similar to block 530 of FIG. 5). In some embodiments, the second network core 170 also controls communications through the second base station transceiver 160 using the second content included in second network components. While the networks 105 and 110 are in the merged state, the mirrored instances of the first network components mirror changes in content of the first network components of the first network core 120. Similarly, the first network components of the first network core 120 mirror changes in content of the mirrored instances of the first network components within the second network core 170.

In some embodiments, the networks 105 and 110 may repeat the method 500 to merge additional networks into the single multi-cell network. In other words, more than two networks may be merged into a single multi-cell network. In such embodiments, the additional networks also perform the method 500.

With the above-described arrangement of the network cores 120 and 170 mirroring each other and the X2 interface established between the base station transceivers 115 and 160, the two network cores 120 and 170 act as a single merged network core. The single merged network core controls both base station transceivers 115 and 160 and their corresponding communication devices 150. In other words, the single merged network core allows the previously isolated networks 105 and 110 to form a single multi-cell network. When the network cores 120 and 170 are mirroring each other to form the single merged network core, the networks 105 and 110 are in the merged state and the network cores 120 and 170 may be referred to as merged network cores. A single merged network core may reduce or eliminate external control messages to manage multiple calls that are occurring at one time over the networks 105 and 110. A single merged network core also allows for handover between base station transceivers 115 and 160 to occur more easily.

Figure 6A:
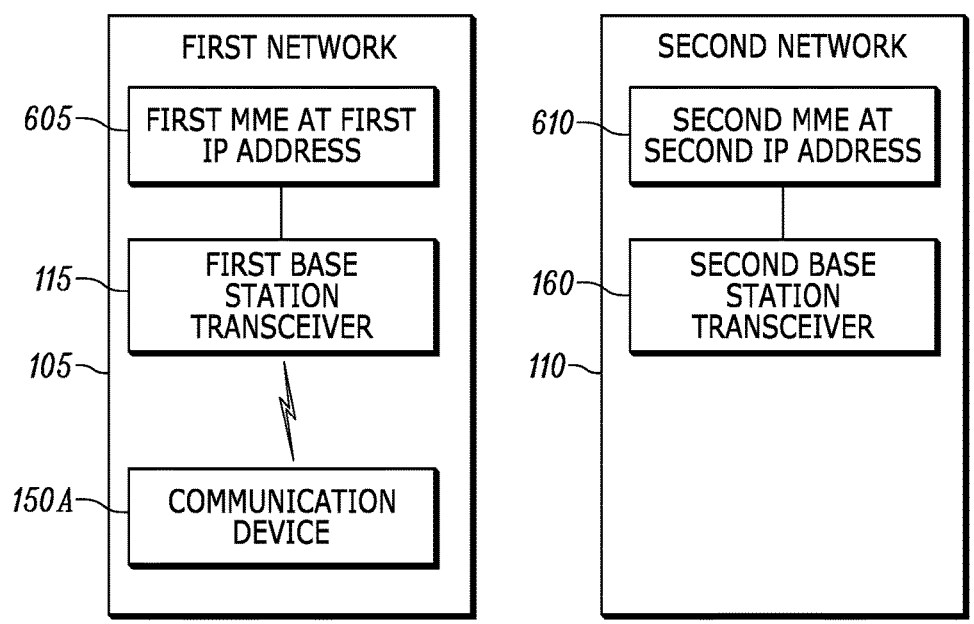
FIG. 6A is a diagram of a simplified version of a first network and a second network included in the communications system of FIG. 1 according to one embodiment.

For example, in the merged state, the same mobility management entity may manage communications of a communication device 150 both before and after a handover occurs between base station transceivers 115 and 160. FIGS. 6A, 6B, and 6C illustrate how such management of communication is possible in some embodiments. FIG. 6A illustrates a simplified version of the first network 105 and the second network 110 when the networks 105 and 110 are isolated from each other. The first network 105 includes a first mobility management entity 605 (in other words, an exemplary first network component) that has a first Internet Protocol address. Communication of the communication device 150A is managed by the first mobility management entity 605 through the first base station transceiver 115 using the first Internet Protocol address. The second network 110 includes a second mobility management entity 610 (in other words, an exemplary second network component) coupled to the second base station transceiver 160 to manage communication of communication devices 150 within the second network 110. The second mobility management entity 610 has a second Internet Protocol address. In FIG. 6A, because the networks 105 and 110 are isolated, the first mobility management entity 605 cannot perform a handover of management of the communications of the communication device 150A to the second base station transceiver 160.

However, by executing the method 500 described previously herein, the networks 105 and 110 may merge when they are within a predetermined distance from each other.

Figure 6B:
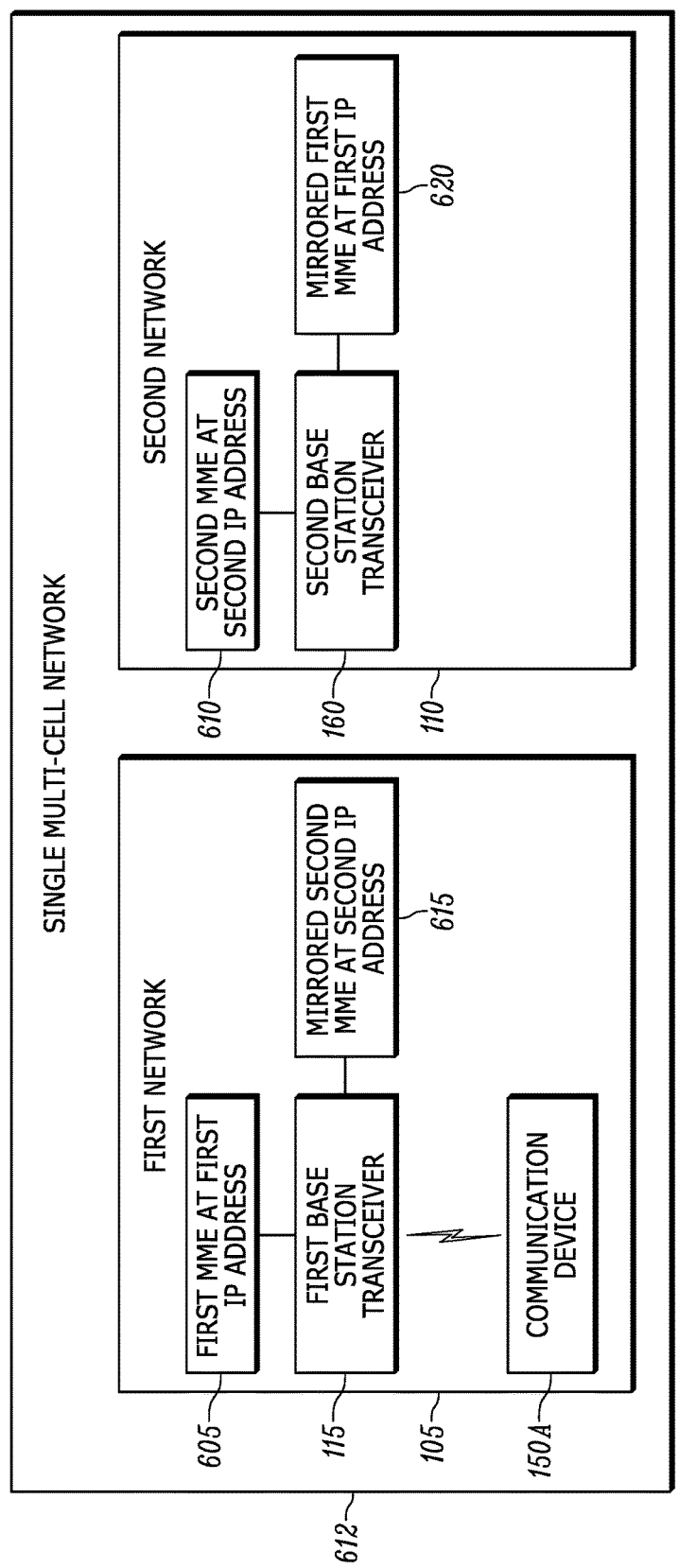
FIG. 6B is a diagram of a simplified version of the first network and the second network of FIG. 6A when the first network and the second network are merged to create a single multi-cell network according to one embodiment.
Figure 6C:
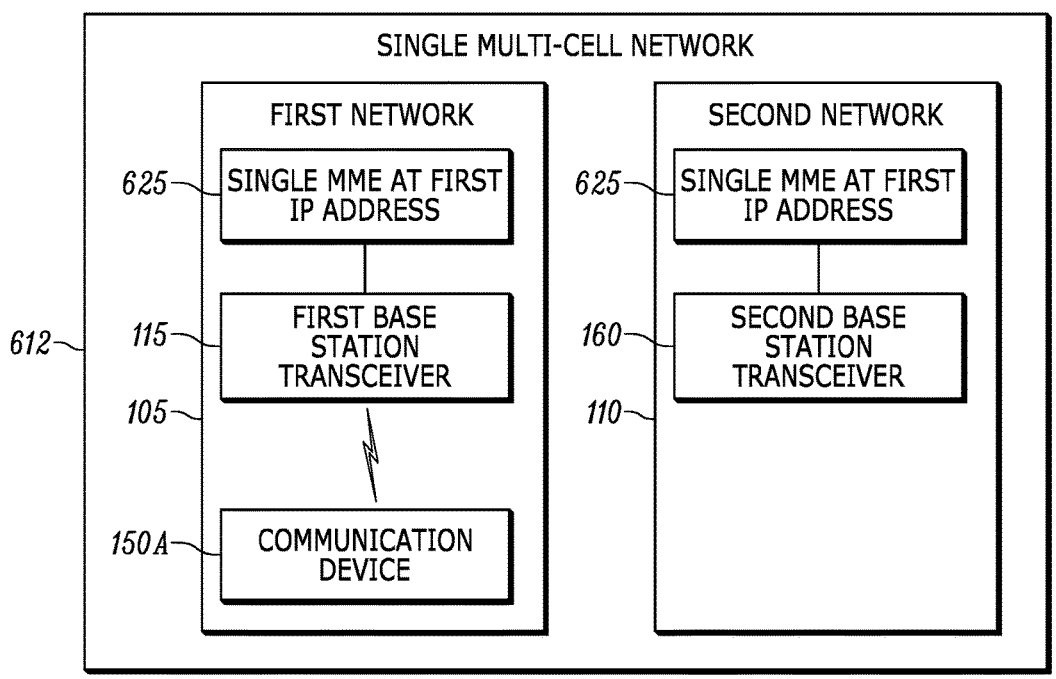
FIG. 6C is a diagram of a simplified version of the first network and the second network of FIG. 6A when the first network and the second network are merged to create a single multi-cell network according to another embodiment.

FIG. 6B illustrates one exemplary embodiment of a simplified version of the networks 105 and 110 when the networks 105 and 110 are merged to create a single multi-cell network 612. In other words, in FIG. 6B, the networks 105 and 110 are in the merged state after executing the method 500 described previously herein. In the embodiment shown in FIG. 6B, the single multi-cell network 612 includes a first cell under the coverage of the first base station transceiver 115 (in other words, the first network 105) and a second cell under the coverage of the second base station transceiver 160 (in other words, the second network 110). The first network 105 includes the same elements as shown in FIG. 6A but also includes a mirrored second mobility management entity 615 (in other words, a virtual mobility management entity) that shares the same second Internet Protocol address as the second mobility management entity 610. Similarly, the second network 110 includes the same elements as shown in FIG. 6A but also includes a mirrored first mobility management entity 620 that shares the same first Internet Protocol address as the first mobility management entity 605.

During use, the communication device 150A may move locations such that the first mobility management entity 605 determines that the communication device 150A has moved such that it is located closer to the second base station transceiver 160 than the first base station transceiver 115. Based on this determination, the first mobility management entity 605 performs a handover of management of the communications of the communication device 150A to the second base station transceiver 160 from the first base station transceiver 115. Using the third communication interface 195 (in other words, the X2 interface), the first base station transceiver 115 communicates to the second base station transceiver 160 that it is handing over the communication device 150A. The mirrored first mobility management entity 620 then manages the communications of the communication device 150A. Because the second network 110 is configured to mirror the first mobility management entity 605 as described previously herein, from the perspective of the base station transceivers 115 and 160 and the communication device 150A, the mobility management entity managing communications of the communication device 150A does not change. In other words, the second base station transceiver 160 communicates with the mirrored first mobility management entity 620 as though it is the first mobility management entity 605 (for example, using the same first Internet Protocol address).

FIG. 6C illustrates another exemplary embodiment of a simplified version of the networks 105 and 110 when the networks 105 and 110 are merged to create the single multi-cell network 612. Similar to FIG. 6B, in the embodiment shown in FIG. 6C, the single multi-cell network 612 includes a first cell under the coverage of the first base station transceiver 115 (in other words, the first network 105) and a second cell under the coverage of the second base station transceiver 160 (in other words, the second network 110). However, in FIG. 6C, the single multi-cell network 612 is configured to act as though it includes a single mobility management entity 625 at a single Internet Protocol address (for example, the first Internet Protocol address). In other words, the first network 105 includes the single mobility management entity 625 at the first Internet Protocol address, and the second network 110 includes the single mobility management entity 625 at the same first Internet Protocol address. In the embodiment shown in FIG. 6C, the networks 105 and 110 are similar networks that have network components (for example, the mobility management entities) pre-configured to have identical Internet Protocol address as mentioned previously herein. When the networks 105 and 110 operate in the isolated state, the identical Internet Protocol addresses do not impact the operation of either isolated network 105 or 110. When the networks 105 and 110 move within a predetermined distance of each other, the networks 105 and 110 enter the transition state to exchange content of their respective network components of the network cores 120 and 170 and their respective applications 140, 145, 180, 182 (see blocks 510, 515, and 520 of FIG. 5). In this embodiment, the mirrored instance of the mobility management entity for each network 105 and 110 is stored within the single mobility management entity 625 of the other network (rather than as a separate mirrored mobility management entity as explained above with respect to FIG. 6B). The networks 105 and 110 then enter the merged state to mirror the operations of each other using the side haul communication channel 190. In the merged state, the networks 105 and 110 include network components with identical Internet Protocol addresses and mirrored content from the other network. Like the embodiment shown in FIG. 6B, when a handover of the communication device 150A from the first base station transceiver 115 to the second base station transceiver 160 occurs, from the perspective of the base station transceivers 115 and 160 and the communication device 150A, the mobility management entity managing communications of the communication device 150A does not change. In other words, the second base station transceiver 160 communicates with the same single mobility management entity 625 with the same content in the second network 110 as in the first network 105 because both networks 105 and 110 include their own instance of the single mobility management entity 625 with mirrored instances of the mobility management entity of the other network.

Although FIGS. 6A-6C illustrate the mobility management entities of the network cores 120 and 170, the mirroring described previously herein is also executed with respect to other the network components of the networks 105 and 110 including the serving gateway, the packet data node gateway, and the home subscriber server. The mirroring described previously herein is also executed with respect to the applications 140 and 145 in the first network 105 that include corresponding applications 180 and 182 in the second network 110. For example, when the content of the application 140 in the first network 105 changes, the side haul communication channel 190 is used to communicate the change to the corresponding mirrored instance of the application in the second network 110. In other words, the mirroring of network components and applications using the side haul communication channel 190 results in dynamic changing of the network components and applications in each network 105 and 110 whenever a change occurs to the network components and applications in either network 105 and 110.

When in the merged state, the networks 105 and 110 may move away from each other such that a single multi-cell network 612 is no longer practical. For example, the networks 105 and 110 may move apart such that second network 110 is no longer within the predetermined distance (for example, wireless communication range) of the first network 105. In such circumstances, the second electronic processor 305 determines that the networks 105 and 110 should no longer be merged and should each return to the isolated state.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of merging isolated networks, wherein a first network includes a first coverage area in which network communications occur via a first moveable base station transceiver and a second network includes a second coverage area in which network communications occur via a second moveable base station transceiver, and wherein the first moveable base station transceiver is located greater than a predetermined distance from the second moveable base station transceiver such that the first coverage area and the second coverage area do not overlap when the first network and the second network are initially deployed, the method comprising:

monitoring, with an electronic processor of the first network, receipt of a location message from the second network;

determining, with the electronic processor of the first network and based on receipt of the location message, that at least one of the first moveable base station transceiver and the second moveable base station transceiver has moved such that the second network is located within the predetermined distance of the first network;

in response to determining that the second network is located within the predetermined distance of the first network, merging the first network and the second network to form a multi-cell network by transmitting first content of a first network core of the first network to the second network over a side haul communication channel;

receiving, at the first network, second content of a second network core of the second network over the side haul communication channel;

storing the second content in the first network core such that
the first network core includes the first content and the second content, and
the first moveable base station transceiver of the first network is capable of communicating with first network components of the first network core and with mirrored instances of second network components of the second network core within the first network core, wherein the mirrored instances of the second network components include the second content received from the second network; and
establishing a communication interface between the first moveable base station transceiver and the second moveable base station transceiver of the second network; and
controlling, with the first network core, communications through the first moveable base station transceiver using the second content included in the mirrored instances of the second network components.

2. The method of claim 1, further comprising:
transmitting the second content to the first network over the side haul communication channel;
receiving, at the second network, the first content over the side haul communication channel;
storing the first content in the second network core such that
the second network core includes the second content and the first content, and
the second moveable base station transceiver is capable of communicating with the second network components and with mirrored instances of the first network components within the second network core;
controlling, with the second network core, communications through the second moveable base station transceiver using the first content included in the mirrored instances of the first network components; and
mirroring, with the mirrored instances of the first network components, changes in content of the first network components based on communications received over the side haul communication channel.

3. The method of claim 1, further comprising mirroring, with the mirrored instances of the second network components, changes in content of the second network components based on communications received over the side haul communication channel.

4. The method of claim 1, wherein storing the second content in the first network core includes storing the second content in the first network core, each of the mirrored instances of the second network components sharing an identical internet protocol (IP) address with its corresponding first network component.

5. The method of claim 1, wherein storing the second content in the first network core includes storing the second content in the first network core, each of the mirrored instances of the second network components having a different IP address than its corresponding first network component.

6. The method of claim 1, further comprising:
determining, with a first mobility management entity (MME) of the first network core, that a communication device is communicating with the first moveable base station transceiver;
managing, with the first MME, communications of the communication device, the first MME having a first IP address;
determining, with the first MME, to perform a handover of management of the communications of the communication device to be handled by the second moveable base station transceiver instead of the first moveable base station transceiver; and
managing, with a mirrored instance of the first MME within the second network core, the communications of the communication device, the mirrored instance of the first MME having the first IP address, the first IP address being different than a second IP address of a second MME of the second network core.

7. The method of claim 1, further comprising:
determining, with a first mobility management entity (MME) of the first network core, that a communication device is communicating with the first moveable base station transceiver;
managing, with the first MME, communications of the communication device, the first MME having an IP address and including first MME content;
determining, with the first MME, to perform a handover of management of the communications of the communication device to be handled by the second moveable base station transceiver instead of the first moveable base station transceiver; and
managing, with a second MME of the second network core, the communications of the communication device, the second MME having the same IP address as the first MME and including the first MME content.

8. The method of claim 1, wherein determining that the second network is located within the predetermined distance of the first network includes receiving, by a first merging communication device of the first network, the location message from a second merging communication device of the second network, the location message indicating a location of the second moveable base station transceiver and that the second network is capable of merging with the first network.

9. The method of claim 1, further comprising:
transmitting third content of at least one first application of the first network to the second network;
receiving, at the first network, fourth content of at least one second application of the second network; and
storing the fourth content in a memory of the first network such that the first network core is capable of accessing a mirrored instance of the at least one second application.

10. The method of claim 1,
wherein transmitting the first content of the first network core of the first network to the second network includes transmitting first home subscriber server (HSS) content, first mobility management entity (MME) content, first serving gateway (SGW) content, and first packet data network gateway (PDN GW) content of a first evolved packet core (EPC) of a first long-term evolution (LTE) network to a second LTE network;
wherein receiving, at the first network, the second content of the second network core of the second network includes receiving second HSS content, second MME content, second SGW content, and second PDN GW content of a second EPC of the second LTE network;
wherein establishing the communication interface between the first moveable base station transceiver and the second moveable base station transceiver includes establishing an X2 interface between the first moveable base station transceiver and the second moveable base station transceiver according to LTE network protocol.

11. A first network having three states, the first network comprising:
- a first moveable base station transceiver;
- a first network core; and
- an electronic processor configured to control the first network to be in one of the three states selected from:
  - an isolated state wherein the first network core controls communication between communication devices through the first moveable base station transceiver using first content of the first network core, wherein the first network includes a first coverage area in which network communications occur via the first moveable base station transceiver and wherein the first moveable base station transceiver is located greater than a predetermined distance from a second moveable base station transceiver of a second network that includes a second coverage area such that the first coverage area and the second coverage area do not overlap when the first network is in the isolated state;
  - wherein, in the isolated state, the electronic processor is configured to monitor receipt of a location message from the second network;
  - a transition state wherein:
    - the electronic processor has determined, based on receipt of the location message, that at least one of the first moveable base station transceiver and the second moveable base station transceiver has moved such that the second network is located within the predetermined distance of the first network, and
    - in response to determining that the second network is located within the predetermined distance of the first network, the first network and the second network are merged to form a multi-cell network by
      - the first network transmitting the first content of the first network core to the second network over a side haul communication channel,
      - the first network receiving second content of a second network core of the second network from the second network over the side haul communication channel,
      - the electronic processor storing the second content in the first network core such that
        - the first network core includes the first content and the second content, and
        - the first moveable base station transceiver is capable of communicating with first network components of the first network core and with mirrored instances of second network components of the second network core within the first network core, wherein the mirrored instances of the second network components include the second content received from the second network, and
      - the electronic processor establishing a communication interface between the first moveable base station transceiver and the second moveable base station transceiver of the second network; and
  - a merged state wherein the first network and the second network are merged to form the multi-cell network and wherein the first network core controls communication between communication devices through the first moveable base station transceiver using the second content included in the mirrored instances of the second network components.

12. The first network of claim 11, wherein the second network includes the second moveable base station transceiver, the second network core, and a second electronic processor configured to control the second network to be in one of the three states selected from:
- the isolated state wherein the second network core controls communication between communication devices through the second moveable base station transceiver using the second content of the second network core;
- the transition state wherein:
  - the second network transmits the second content to the first network over the side haul communication channel,
  - the second network receives the first content from the first network over the side haul communication channel, and
  - the second network stores, with the second electronic processor, the first content in the second network core such that
    - the second network core includes the second content and the first content, and
    - the second moveable base station transceiver is capable of communicating with the second network components and with mirrored instances of the first network components within the second network core; and
- the merged state wherein:
  - the second network core controls communication between communication devices through the second moveable base station transceiver using the first content included in the mirrored instances of the first network components, and
  - the mirrored instances of the first network components mirror changes in content of the first network components based on communications received over the side haul communication channel.

13. The first network of claim 11, wherein during the merged state, the mirrored instances of the second network components mirror changes of content of the second network components based on communications received over the side haul communication channel.

14. The first network of claim 11, wherein each of the mirrored instances of the second network components share an identical internet protocol (IP) address with its corresponding first network component.

15. The first network of claim 11, wherein each of the mirrored instances of the second network components have a different IP address than its corresponding first network component.

16. The first network of claim 11, wherein the first network core includes a first mobility management entity (MME) with a first IP address and the second network core includes a mirrored instance of the first MME with the first IP address and a second MME with a second IP address that is different than the first IP address, wherein
the first MME is configured to
- determine that a communication device is communicating with the first moveable base station transceiver,
- manage communications of the communication device, and
- determine to perform a handover of management of the communications of the communication device to be handled by the second moveable base station transceiver instead of the first moveable base station transceiver; and the mirrored instance of the first MME is configured to manage the communications of the communication device after the handover occurs.

17. The first network of claim 11, wherein the first network core includes a first mobility management entity (MME) with an IP address and including first MME content, and the second network core includes a second MME with the same IP address as the first MME and including the first MME content, wherein the first MME is configured to
determine that a communication device is communicating with the first moveable base station transceiver,
manage communications of the communication device, and
determine to perform a handover of management of the communications of the communication device to be handled by the second moveable base station transceiver instead of the first moveable base station transceiver; and
wherein the second MME is configured to manage the communications of the communication device after the handover occurs.

18. The first network of claim 11, wherein a first merging communication device of the first network receives the location message from a second merging communication device of the second network, the location message indicating a location of the second moveable base station transceiver and that the second network is capable of merging with the first network;

wherein the electronic processor determines that the second network is located within the predetermined distance of the first network based on the location of the second moveable base station transceiver.

19. The first network of claim 11, wherein during the transition state:
the first network transmits third content of at least one first application of the first network to the second network;
the first network receives fourth content of at least one second application of the second network; and
the electronic processor stores the fourth content in a memory of the first network such that the first network core is capable of accessing a mirrored instance of the at least one second application.

20. The first network of claim 11, wherein the first network is a first long-term evolution (LTE) network, the second network is a second LTE network, the first network core is a first evolved packet core (EPC), and the second network core is a second EPC;
wherein the first content includes first home subscriber server (HSS) content, first mobility management entity (MME) content, first serving gateway (SGW) content, and first packet data network gateway (PDN GW);
wherein the second content includes second HSS content, second MME content, second SGW content, and second PDN GW content;
wherein the communication interface between the first moveable base station transceiver and the second moveable base station transceiver is an X2 interface according to LTE network protocol.

* * * * *